Figure 1:
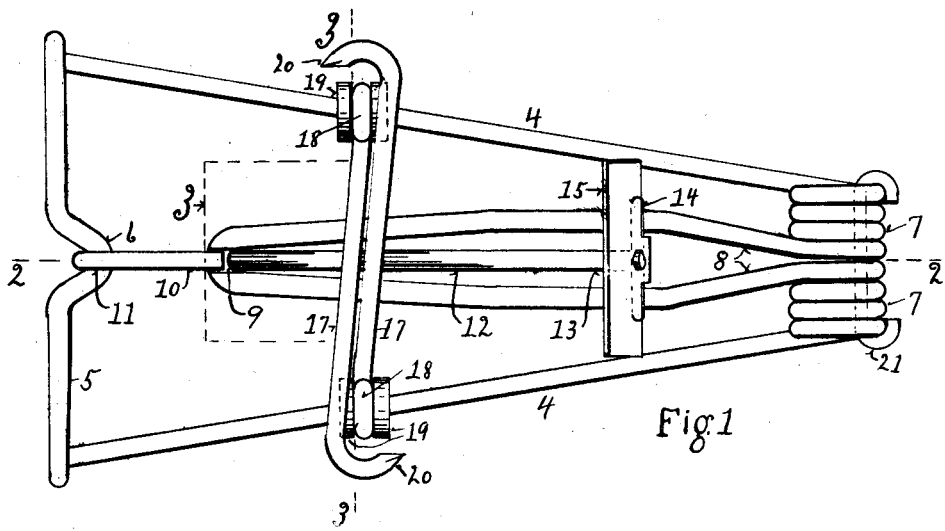

W. BUCK.
GOPHER TRAP.
APPLICATION FILED APR. 30, 1913.

1,105,586. Patented July 28, 1914.

Witnesses

Inventor
William Buck

UNITED STATES PATENT OFFICE.

WILLIAM BUCK, OF PAXICO, KANSAS.

GOPHER-TRAP.

1,105,586.  Specification of Letters Patent.  Patented July 28, 1914.

Application filed April 30, 1913. Serial No. 764,557.

*To all whom it may concern:*

Be it known that I, WILLIAM BUCK, a citizen of the United States, residing at Paxico, in the county of Wabaunsee and State of Kansas, have invented certain new and useful Improvements in Gopher-Traps, of which the following is a specification.

The object of my invention is to produce a gopher trap that will not become clogged or made inoperative by filling up with the loose earth, and that is certain in catching the animal; also to improve the traps in the points of simplicity of construction and operation, of economy of construction, strength, and durability.

The main portions of my trap are made of spring steel wire, formed in special shape so as to be not easily clogged by the loose earth.

My invention comprises the special arrangement of the spring steel wire and other associated parts, and the details of construction hereinafter set forth and claimed.

In the drawings accompanying and forming part of this specification and in the description of the drawings, I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 2:
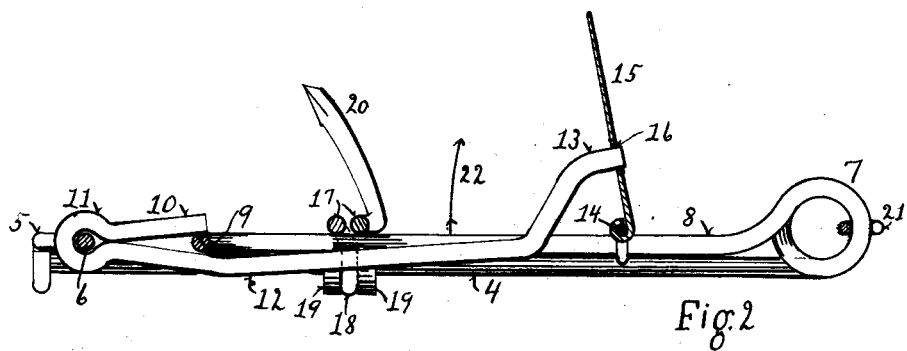
Figure 3:
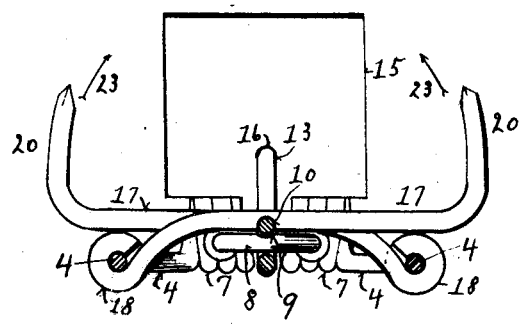

Figure 1 is a plan view of a trap made in accordance with the principles of my invention, the trap being set. Fig. 2 is a vertical longitudinal center sectional elevation, on a plane indicated approximately by the line 2 in Fig. 1. Fig. 3 is a transverse sectional elevation approximately on planes indicated by the irregular line 3 in Fig. 1.

Similar reference characters indicate like or corresponding parts throughout the several views.

The base of my trap comprises the two legs 4, 4, which are connected at their front ends by means of a cross-rod 5, which has a centrally disposed offset bearing 6. At the rear, the wire forming the two legs is continued in the form of spring coils 7, 7, and thence continues in the form of a lever formed by the spring wire being bent upon itself. This lever extends toward the front end of the trap, its extreme forward end having a groove 9 where it bears against one end 10 of a rod which is formed with a loop 11 to engage the offset 6, and which thence extends rearwardly, as shown at 12, under and between the two legs 8, 8 of the lever or spring arm. Spanning the two legs of the spring arm is a rod 14 on which is hinged a plate 15 having a hole 16 in which is inserted the rear upwardly bent end 13 of the rod 12.

17, 17 are two jaws, each made from round wire or rod, and each having at one end a loop 18 to embrace one of the base legs between adjacent washers 19, 19, which latter may be secured to the leg by soldering or otherwise. Each jaw is formed at its other end with an upward bend the extremity being sharply pointed, as shown at 20. The two jaws are slightly inclined from exact transverse alinement so as not to interfere with each other; but their terminal bends are also bent so as to engage each other when the jaws are swung on their pivots.

The tension of the coils tends to force the lever 8, which may also be called the spring arm, or spring tongue, upward, as indicated by the arrow 22. And when the tongue is released, its upward movement causes movement of the jaws as indicated by the arrows 23, 23,—their closing movement.

The trap is held in its "set" position by reason of the latch 10 engaging the tongue in the groove 9; and the latch is held in such position by reason of its rear end 13 engaging in the hole 16 of the plate 15, which plate constitutes the trigger, it being a nose-piece against which the animal strikes when he springs the trap.

The trap is to be placed in the gopher hole, set. When the gopher crawls over the trap and strikes against the trigger, the trap is sprung and the animal impaled between the jaws.

It is a feature of my invention that it cannot be easily clogged by the loose earth, it being made in the main part of round spring steel wire and being formed without crevices or corners which would hold the earth, stones, or other matter interfering with its free operation.

21 is a tie rod to hold the coils together, to prevent them from spreading apart.

What I claim is:

1. The combination of a continuous spring wire forming two legs of a base, a spring coil, and a forwardly-extending spring arm;

a rod connecting the two legs at the forward end of the trap, said coil being at the rear end, and said connecting rod having an offset bearing, a latch for said spring arm comprising a single rod having a loop engaging said offset bearing, a short portion engaging said spring arm, and a long portion extending rearwardly, a trigger for engaging said long portion, said trigger being pivoted to said spring arm, and a pair of transversely disposed jaws, each jaw being pivoted to one of the base legs and extending thence across and resting freely upon said spring arm, said jaws being actuated by said spring arm, and said legs being formed with washers on opposite sides of each jaw to prevent longitudinal displacement of said jaws.

2. The combination of a continuous spring wire forming two legs of a base, a spring coil at one end of the trap, and a forwardly-extending spring arm; a rod connecting the two legs at the forward end, a latch for engaging the forward and free end of the spring arm, said latch being pivoted to said connecting-rod and extending rearwardly, a trigger pivoted to said spring arm for engaging said latch, and a pair of transversely disposed impaling jaws pivoted to the opposite legs respectively of the base near the front end of the trap and extending across said spring arm and resting freely thereon and actuable thereby, said legs being provided with washers for preventing said jaws from moving longitudinally of said legs.

In testimony whereof I have affixed my signature in presence of two witnesses.

WILLIAM BUCK.

Witnesses:
W. H. COWLES,
J. M. STARK.